United States Patent
Chen et al.

(10) Patent No.: US 7,420,336 B2
(45) Date of Patent: Sep. 2, 2008

(54) METHOD OF CONTROLLING CATHODE VOLTAGE WITH LOW LAMP'S ARC CURRENT

(75) Inventors: Timothy Chen, Aurora, OH (US); Wei Xiong, Lakewood, OH (US); Bruce Roberts, Mentor on the Lake, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/063,079

(22) Filed: Feb. 22, 2005

(65) Prior Publication Data

US 2006/0145633 A1     Jul. 6, 2006

Related U.S. Application Data

(60) Provisional application No. 60/640,390, filed on Dec. 30, 2004.

(51) Int. Cl.
    *H05B 37/00*     (2006.01)
(52) U.S. Cl. .................. 315/247; 315/105; 315/247; 315/291
(58) Field of Classification Search ............ 315/105, 315/106, 291, 224, 247
See application file for complete search history.

(56) References Cited

U.S. PATENT DOCUMENTS

| | | | |
|---|---|---|---|
| 4,853,598 A * | 8/1989 | Kusko et al. | ................ 315/101 |
| 5,008,597 A | 4/1991 | Zuchtriegel | |
| 5,438,243 A | 8/1995 | Kong | |
| 5,512,801 A | 4/1996 | Nilssen | |
| 5,519,289 A | 5/1996 | Katyl et al. | |
| 5,569,984 A | 10/1996 | Holtslag | |
| 5,623,187 A | 4/1997 | Caldeira et al. | |
| 5,731,667 A | 3/1998 | Luchetta et al. | |
| 5,744,915 A | 4/1998 | Nilssen | |
| 5,789,866 A * | 8/1998 | Keith et al. | ................ 315/105 |

(Continued)

FOREIGN PATENT DOCUMENTS

DE     197 15 259 A1     10/1998

(Continued)

OTHER PUBLICATIONS

Yunfen Ji, et al., "Compatibility Testing of Fluorescent Lamp and Ballast Systems", *IEEE Transactions on Industry Applications*, IEEE Service Center, Piscataway, NJ, vol. 35, No. 6, Dec. 1999.

(Continued)

*Primary Examiner*—David H Vu
(74) *Attorney, Agent, or Firm*—Fay Sharpe LLP

(57) ABSTRACT

The embodiment disclosed herein relates to systems and methods to provide improvements to power delivery systems employed with lamps in general and fluorescent lamps in particular. In accordance with one exemplary embodiment, cathode current is controlled to a maximum level to quickly bring the cathode temperature up to thermionic emission temperature. After lamp ignition, a cathode voltage reduction circuit is employed to reduce voltage of the external cathode heating. Power is supplied to a power factor correction circuit via an IC, in accordance with a second exemplary embodiment. Finally, a third disclosed embodiment addresses desensitizing the lamp from various deleterious parasitic capacitive effects associated with the power delivery to one or more lamps.

13 Claims, 11 Drawing Sheets

U.S. PATENT DOCUMENTS

| | | |
|---|---|---|
| 5,796,216 A | 8/1998 | Beasley |
| 5,834,903 A | 11/1998 | Christian |
| 5,834,906 A | 11/1998 | Chou et al. |
| 5,932,976 A | 8/1999 | Maheshwari et al. |
| 5,982,113 A | 11/1999 | Crouse et al. |
| 5,982,642 A | 11/1999 | Herfurth |
| 6,011,362 A | 1/2000 | Moisin |
| 6,020,691 A | 2/2000 | Sun et al. |
| 6,034,489 A | 3/2000 | Weng |
| 6,184,630 B1 | 2/2001 | Qian et al. |
| 6,208,085 B1 | 3/2001 | Lehnert et al. |
| 6,236,168 B1 | 5/2001 | Moisin |
| 6,337,800 B1 | 1/2002 | Chang |
| 6,396,220 B1 | 5/2002 | Delia et al. |
| 6,417,631 B1 | 7/2002 | Chen et al. |
| 6,483,252 B2 | 11/2002 | Bruning |
| 6,495,971 B1 | 12/2002 | Greenwood et al. |
| 6,501,225 B1 * | 12/2002 | Konopka .................... 315/105 |
| 6,809,477 B2 | 10/2004 | Soules et al. |
| 2002/0140373 A1 | 10/2002 | Ribarich et al. |
| 2002/0191429 A1 | 12/2002 | Nadd et al. |
| 2003/0160554 A1 | 8/2003 | Soules et al. |
| 2004/0051475 A1 | 3/2004 | Griffin |
| 2004/0051479 A1 | 3/2004 | Weirich |
| 2004/0070324 A1 | 4/2004 | Lisitsyn |
| 2005/0067967 A1 * | 3/2005 | Chen et al. ................... 315/107 |
| 2006/0103317 A1 * | 5/2006 | Chen et al. ................... 315/98 |

FOREIGN PATENT DOCUMENTS

| | | |
|---|---|---|
| EP | 1 657 968 A2 | 5/2006 |
| EP | 1 657 969 A1 | 5/2006 |
| WO | WO 93/23974 | 11/1993 |
| WO | WO 95/10168 | 4/1995 |

OTHER PUBLICATIONS

Guan-Chyun Hsieh, et al., "Harmonizing Strategy for Breaking the Striations in the Fluorescent Lamp", *IEEE Transactions of Industrial Electronics*, IEEE Service Center, Piscataway, NJ, vol. 48, No. 2, Apr. 2001.

J.W.F. Dorleijn, et al., "Standardisation of the Static Resistances of Flouescent Lamp Cathodes and New Data for Preheating", *Conference Record of the 2002 IEEE Industry Applications Conference*, 37th IAS Annual Meeting, Pittsburgh, PA, Oct. 13-18, 2000, NY, NY, IEEE, US, vol. 1, pp. 665-672.

* cited by examiner

MATCH TO FIG. 2A

MATCH TO FIG. 5A

METHOD OF CONTROLLING CATHODE VOLTAGE WITH LOW LAMP'S ARC CURRENT

This application claims the benefit of Provisional Patent Application No. 60/640,390, filed Dec. 30, 2004, the disclosure of which is incorporated herein in its entirety, by reference.

BACKGROUND

Generally, there are two types of ballasts employed in today's fluorescent lamps; programmed start ballasts and instant start electronic ballasts. Typically, a program start electronic ballast provides a relatively low voltage across the lamp with a separate cathode heating current during lamp startup. Pre-heating the cathode before lamp ignition lowers the amount of voltage needed to strike the lamp, that is, the glow discharge current is minimized. By minimizing the glow discharge current, the cathode life is extended since the amount of the cathode that is spattering off during lamp startup is minimized, extending the overall life of the lamp.

This type of lighting system finds particularly useful application in a setting where the lights are frequently turned on and off, such as in a conference room, a lavatory, or other setting that sees frequent but non-continuous usage. In these settings, light is needed when the room is in use, but typically the lights are turned off to save energy when no one is using the room. In short, the program start electronic ballast is beneficial for applications in which the lamps undergo a high number of on/off cycles.

Despite its advantages, the program start electronic ballast does have drawbacks. First, because it has to pre-heat the cathode before it strikes the lamp, there is a noticeable delay from the time when the light switch is activated to the time when the lamp emits visible light. Typically this delay is on the order of 1.5 seconds. This delay can be referred to as preheat or waiting time and is a disadvantage in settings where a user expects an almost instantaneous lighting of an area.

Another drawback of the program start lamp ballasts is that they are commonly utilized in a series lamp configuration. In a series configuration, if one lamp fails, it will shut down the circuit for the whole ballast, causing all lamps in the ballast to be turned off. Thus, the lamps in the ballast produce no light where they could be producing light from other lamps if the lamps were in a parallel configuration. Since all lamps will not be producing light, more frequent servicing of the lighting installation will be required, increasing the cost of labor to maintain the system.

Yet another disadvantage to the program start ballast is when lamp current is low (e.g., below 160 mA), external cathode heating can be required in order to maintain the rated lamp's life. Conventional program start ballast configurations do not address this issue of optimizing cathode heating for both preheat and operation which can minimize start time and provide energy savings.

The second conventional type of ballast, the instant start ballast, addresses some issues of the program start ballast, however, it introduces some new issues of its own. Typically, an instant start ballast does not pre-heat the cathodes, rather it applies the operating voltage directly to the lamp. In this design, at the moment the switch is turned on, a high voltage is provided across the lamp. For a typical system, the voltage can be about 600 V, and the peak voltage can be up to about 1000 V. With this high voltage across the lamp, sufficient glow current exists to bring the lamp up to a point where the lamp will ignite quickly. The lamp, therefore, has a much shorter ignition time (typically about 0.1 seconds) as compared to the program start systems, and light is seen substantially concurrently with the activation of the light switch. Also, there is no extra current drain to the cathodes during operation, since the operating voltage is applied directly to the lamp cathodes. Instant start ballasts also use parallel lamp configurations with inherently built-in redundancy in the event of the lamp failure.

However, the instant start ballast produces a glow discharge current, which degrades the integrity of the cathodes during the brief period before the lamp strikes. Over time, with instant start ballasts, the cathodes degrade at a rate, leading to an early failure of the lamp. Thus, a drawback of the instant start ballast is premature lamp failure. Because an instant start ballast burns through cathodes so quickly, lamps may fail long before their expected lifetimes.

While the program start ballasts are inefficient because they waste power, the instant start ballasts are inefficient because they may require more lamps for a given amount of time. Consequently, it is desirable to take the advantages of the beneficial aspects of the program start ballast (e.g., longer lamp life) and combine them with the advantages of the instant start ballast (e.g., quick start time) to produce an improved lamp ballast. The present application contemplates a method and apparatus that combines the positive aspects of the program start and instant start ballasts without propagating the negative aspects of those ballasts.

SUMMARY

In accordance with one aspect of the present application, a ballast designed to provide power to at least one lamp is employed, that comprises an active power factor correction (PFC) circuit configured to receive alternating current from at least one source and converts the alternating current to direct current; an integrated chip that controls the operation of the power factor correction circuit; and a power supply component configured to deliver power to the integrated chip, wherein the power supply component employs a speed up power supply circuit to reduce overall ignition time of the ballast.

According to another aspect of the present application, a method of controlling cathode voltage of at least one lamp connected to a ballast is utilized, that comprises receiving power from a power supply; controlling cathode current to bring cathode temperature up to thermionic heating temperature; igniting at least one lamp; and reducing the voltage level of at least one cathode associated with the at least one lamp.

DETAILED DESCRIPTION

Figure 1:
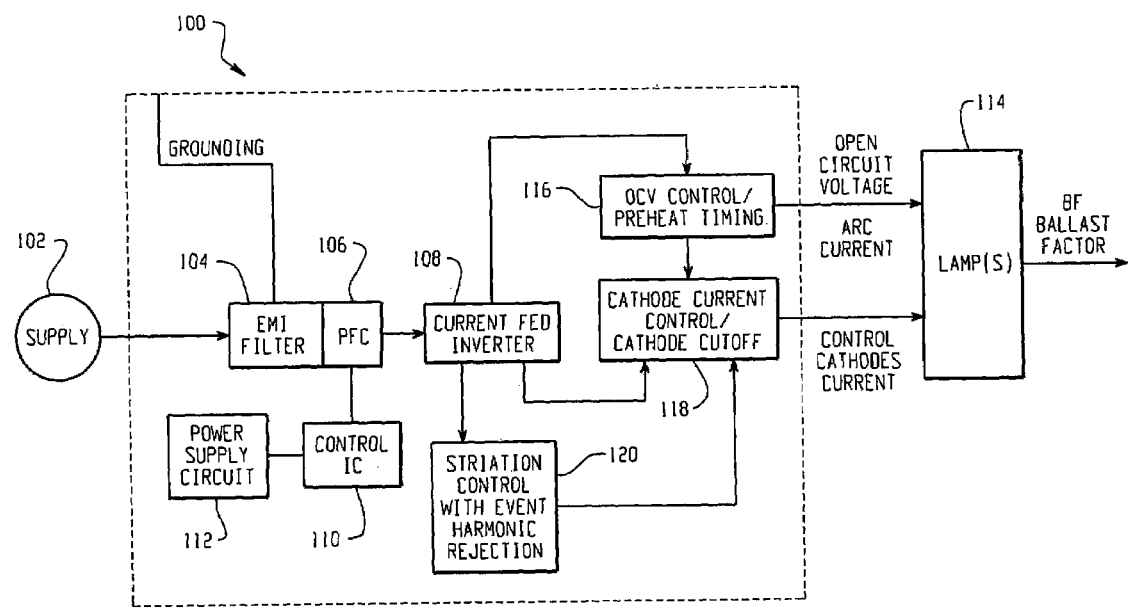
FIG. 1 is a block diagram illustration of the ballast in accordance with an exemplary embodiment.

FIG. 1 is a block diagram 100 that illustrates a lamp ballast according to one exemplary embodiment. The block diagram 100 outlines a power factor correction and a current fed based inverter. In this new circuit platform, the output inverter controls high frequency voltages to each individual lamp to be less than 300 $V_{PK}$ during preheat, so that the glow discharge current in the lamps are relatively low (e.g., less than 10 mA). After approximately 0.3 seconds of preheat time, the peak voltage across the lamp shifts and increases to 1100 V as required, thus breaking down the lamp. A buffer circuit is incorporated in the design to isolate each lamp from another during operation, so that each lamp works independently.

A voltage supply 102 provides an AC signal to the ballast 100. The voltage supply 102 can provide a wide range of input voltages, such as 120 V, 230 V or 277 V at 50 or 60 Hz for example. Such power is delivered to an electromagnetic interference filter (EMI) 104 and is converted from AC to a DC bus signal by a power factor correction circuit (PFC) 106. The PFC 106 supplies the DC bus signal to an inverter circuit 108, which may be a current fed inverter. In certain embodiments, the PFC 106 can make the ballast input line current distortion low, for example, less than 10% for a 120 volt input and less than 20% for a 277 volt input. It is to be appreciated that inverter circuit 108 can be any appropriate inverter circuit including half-bridge current fed invertors, and current fed push-pull invertors, for example. Further, the PFC 106, in this embodiment, can be an active power factor correction circuit which is able to accept a wide range of input voltages.

A control integrated chip (IC) 110 can be employed with a power supply circuit 112 to provide control to the PFC 106 operation. Conventionally, a power factor correction circuit can utilize an excessive amount of time to be initialized. However, as disclosed in the embodiment disclosed herein, such time can be reduced via the power supply circuit 112 with the control IC 110. For instance, the power supply can reach a desired voltage level in 0.1 seconds instead of 0.4–0.5 seconds utilizing conventional circuitry.

After passing through the PFC 106, power is passed to a lamp or set of lamps 114 by the inverter 108, it is first gated by an open circuit voltage (OCV) controller 116. The controller 116 times how long a pre-heat current should be applied to cathodes of the lamps 114, and passes that information to a cathode current controller 118. In one embodiment, the open circuit voltage controller 116 will control the voltage to the lamp to be less than about 300 V peak across each lamp 114 during the pre-heat phase such that the glow discharge current in the lamps are low (e.g., less than 10 mA). During this time, the cathode current controller 118 applies the pre-heat current to lamps 120 before the operating voltage is applied to the lamps 120 to ignite and operate the lamps in steady-state.

The pre-heating phase lasts approximately 0.3 seconds, after which the cathode current controller 118 switches off current to the cathodes of the lamps 114. Next, the open circuit voltage controller 116 will shift up the voltage to ignite the lamp or lamps. In this embodiment, once the peak voltage across the lamps shifts and increases up to 1100 V as required to break down the lamp. It is to be appreciated that the open circuit voltage controller 116 and cathode current controller 118 may each be one of integrated circuit controllers as well as controllers designed as discrete circuit components. The OCV controller 116 is designed as a buffer and decoupling arrangement or circuit whereby the lamps of the system are isolated from each other, so each lamp works independently.

A striation control component 120 can accept power from the current fed inverter 108 and pass this power through to the cathode current controller 118. The striation control component can be employed to eliminate light and dark gradient differences in a lamp, for example. In one embodiment, the striation control component 120 can utilize even harmonics injection to limit such undesirable striation effects.

Thus, the embodiment of FIG. 1, as will be explained in greater detail below, illustrates a circuit which uses a current fed based parallel lamp instant electronic ballast topology. The cathode's current is controlled to a maximum level to quickly bring the cathode temperature up to a thermionic emitting temperature, or Rh/Rc>5, where Rh/Rc is the ratio of the final heated or hot cathode resistance (Rh) to the cold cathode resistance (Rc) at 25° C. In addition, the design of FIG. 1, and the more detailed figures to follow, incorporates a cathode voltage reduction circuit, which reduces voltage of the external cathode heating after the lamp is ignited. The voltage reduction circuit can provide benefits such as increased lamp life, higher system efficiency and low cost in a single design package. Further, the described lighting system can retain the high quality and reliability of typical instant start systems. The topology also illustrates new speed-up power supply circuitry to reduce the overall ignition time of the ballast, and desensitizing circuitry that minimizes noise affect.

Figure 2A:
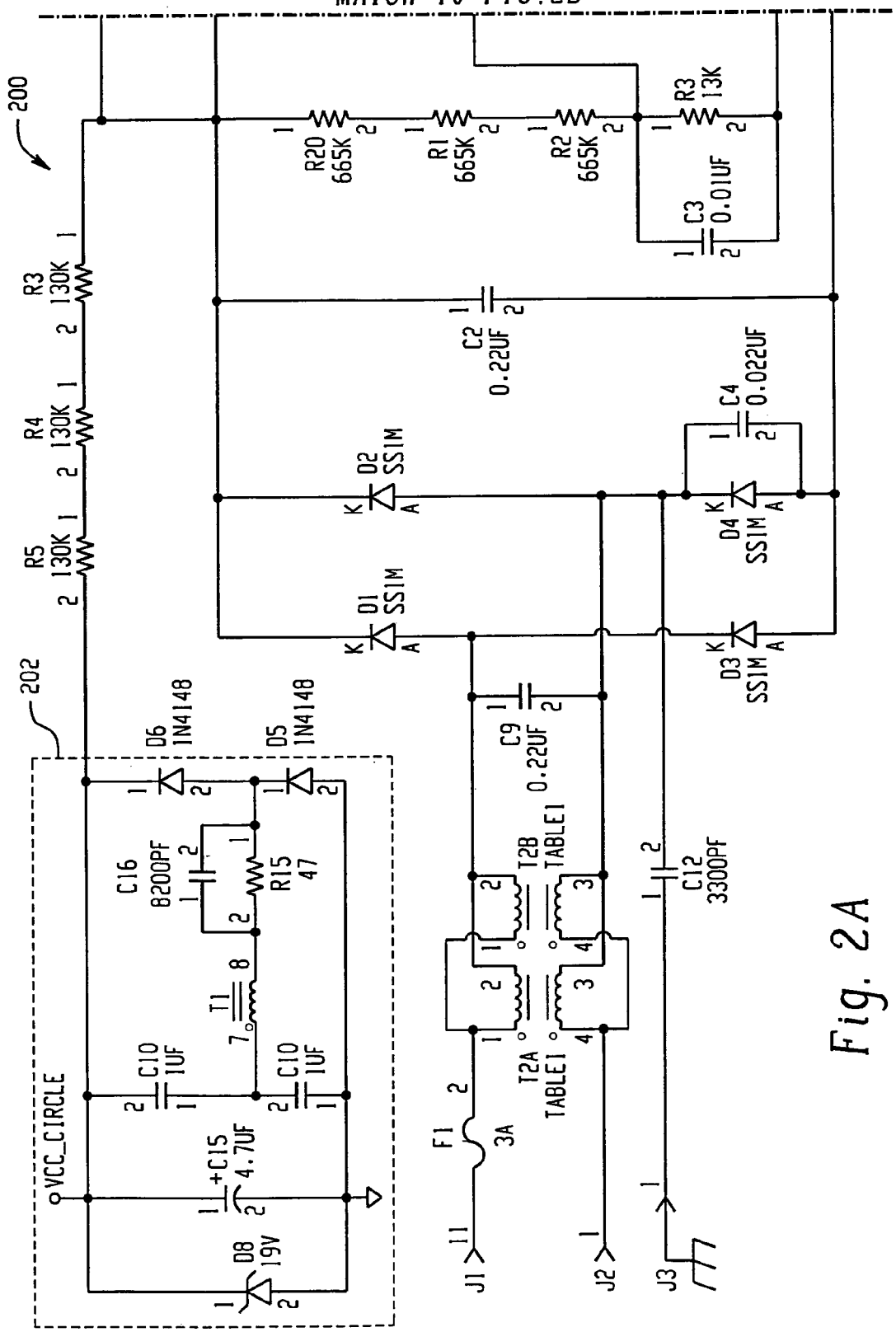
FIGS. 2A and 2B show a circuit diagram of an inverter circuit that employs a high speed startup circuit in accordance with an exemplary embodiment.
Figure 2B:
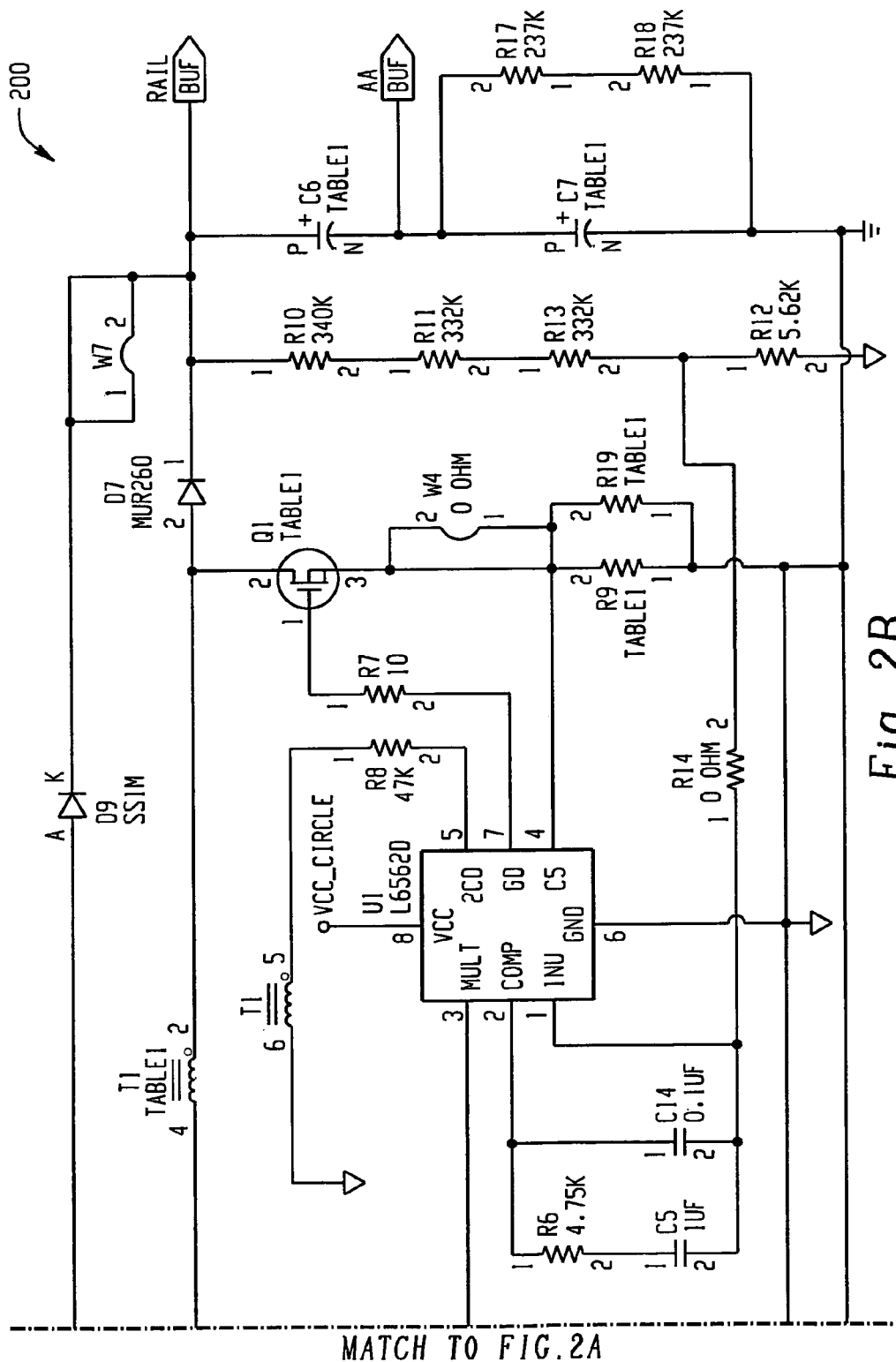

Turning now to FIGS. 2A and 2B, which illustrate a more detailed circuit diagram 200 of FIG. 1 above. A voltage input $Q_{VCC\text{-}CIRCLE}$ is accepted by a high speed startup circuit 202, which is a sub-circuit of diagram 200. The high speed startup circuit 202 is employed to quickly reach a desired power level in a relatively short amount of time to provide power to the PFC 106, as described above. For instance, in conventional configurations, a delay of 0.4–0.5 seconds is expected to reach a desired power level. In contrast, the high speed startup circuit 202 can reach a desired power level in approximately 0.1 seconds. This shortened time period is due at least in part to the low capacitance of C15. In one embodiment, the capacitance of C15 can be 4.7 uF, for example. The high speed startup circuit 202 comprises capacitors C10, C11, C15 and C16, diodes D5, D6 and D8; inductor T1 and resistor R15. Diode D8 is preferably a Zener diode. Winding T1 is connected between C10 and C11 on one side and connected to an RC circuit on the other. The RC circuit consists of capacitor C16 and resistor R15. Whereas one side of the RC circuit is connected to winding T1, the other side of the RC circuit is connected between diodes D5 and D6.

Thus, a circuit consisting of C10, C11, C16, R15, D5 and D6 is employed to provide a quick charge to C15 upon the initializations of the circuit and regulated power supply to the IC (component U1) during operation. The R15 is utilized to limit the steady state current and power dissipation in the D5, D6 and U1. The C16 resonates with leakage inductor of winding T1 when the power factor correction IC U1 reaches the turn-on threshold thereby providing peak charge current to C15. The peak charge current ensures that the voltage to IC power supply pin does not drop below the turnoff threshold. Thus, the power supply circuit is applicable for a wide input voltage range. Therefore, a smaller energy storage capacitor C15 is employed in this design which in turn provides a quicker overall starting time for the ballast than by conventional circuits.

In this configuration, the capacitance of C15 is low in order to provide desired power in a short time. However, such low capacitance also limits the amount of energy C15 is capable of storing. Such an energy level (e.g., 10V) must be maintained in order to prevent deleterious effects on the circuit such as chronic on/off switching of the high speed startup circuit 202. As shown, C16 resonates with winding T1, the secondary of the boost inductor on pin 4 to 2. Such resonance is known in the art and inherent resonance exists with a linkage inductor (not shown) of T1 built into the conjunction of the transformer. C15 will resonate with the linkage inductor and provide much higher energy during the initial startup to charge C15 and/or to maintain C15 voltage to be higher than 10 V and will not drop below such a voltage. In this manner, the power required to provide power to the IC chip U1 will be uninterrupted.

Thus, this configuration allows a higher resonant charge to occur so the C15 voltage will not dip below a desired voltage level which in turn could turn off the service hold of the IC. Once the PFC 106 is up and running and the output voltage is regulated, the voltage across C15 is proportional to bus voltage (voltage across capacitors C6 and C7). In other words, the power supply circuit on C15 is proportional to the output voltage C6 and C7, which is regulated.

Resistance is provided between the high speed startup circuit 202 and the balance of the circuit via three resistors R5, R4 and R16. It is to be appreciated that each resistor value can vary, however, resistors R5, R4 and R16 can all have a value of 130 K ohms in accordance with one aspect of the exemplary embodiment. The remainder of the circuit is employed to provide connectivity to the U1 which is a detailed view of the control IC 108 from above. This particular configuration illustrates 8 pins connected to U1, wherein pins 8 and 6 represent are employed to power the control IC U1. In particular, pin 6 in connected to voltage input $Q_{VCC-CIRCLE}$ and pin 8 is connected to ground. The remaining 6 pins, 1, 2, 3, 4, 7 and 5 relate to logic employed to control delivery of power from the power supply circuit to the PFC 106.

Figure 3A:
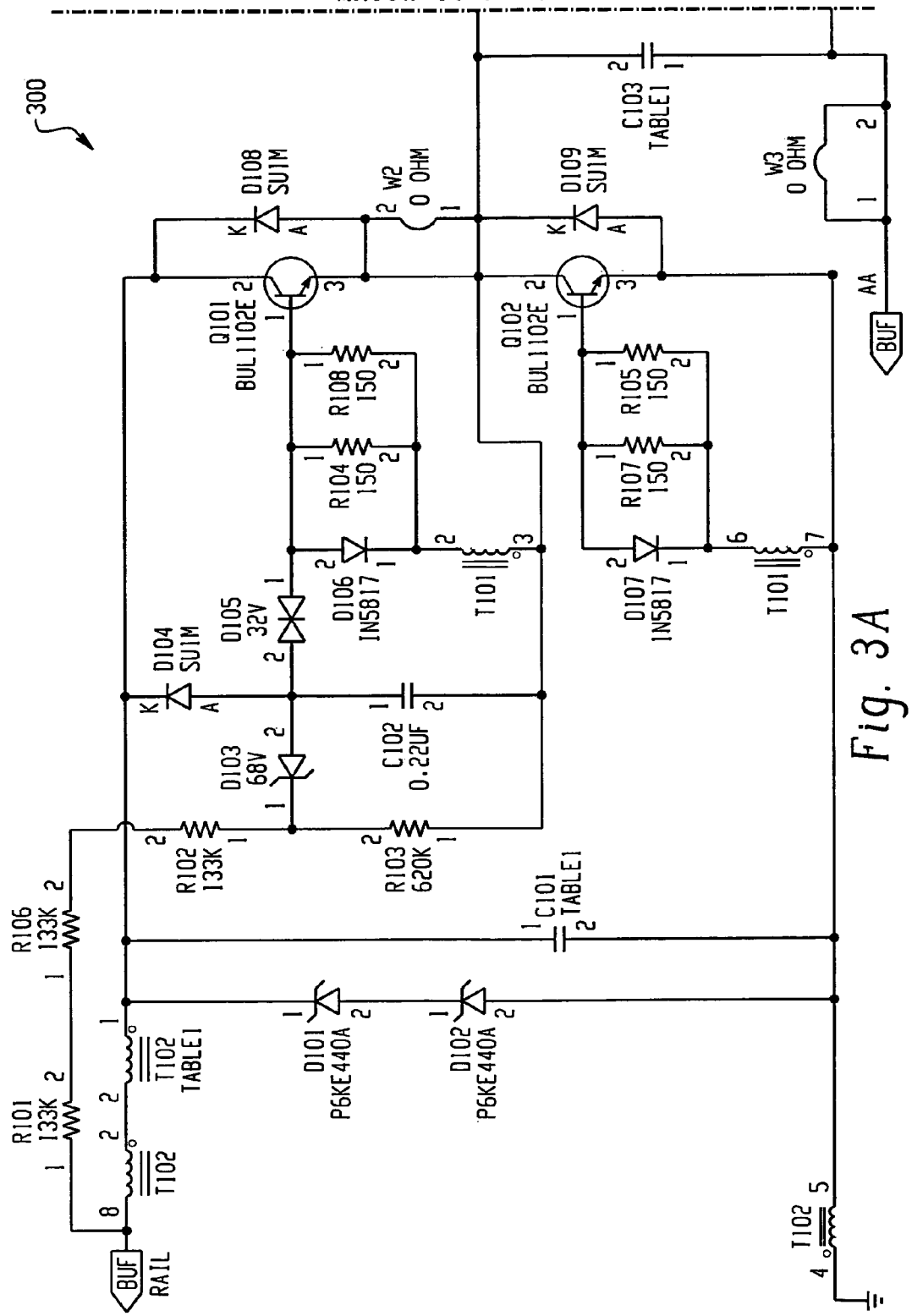
FIGS. 3A and 3B illustrate a circuit diagram of a load/fixture circuit that employs a cathode heating circuit arrangement in accordance with an exemplary embodiment.
Figure 3B:
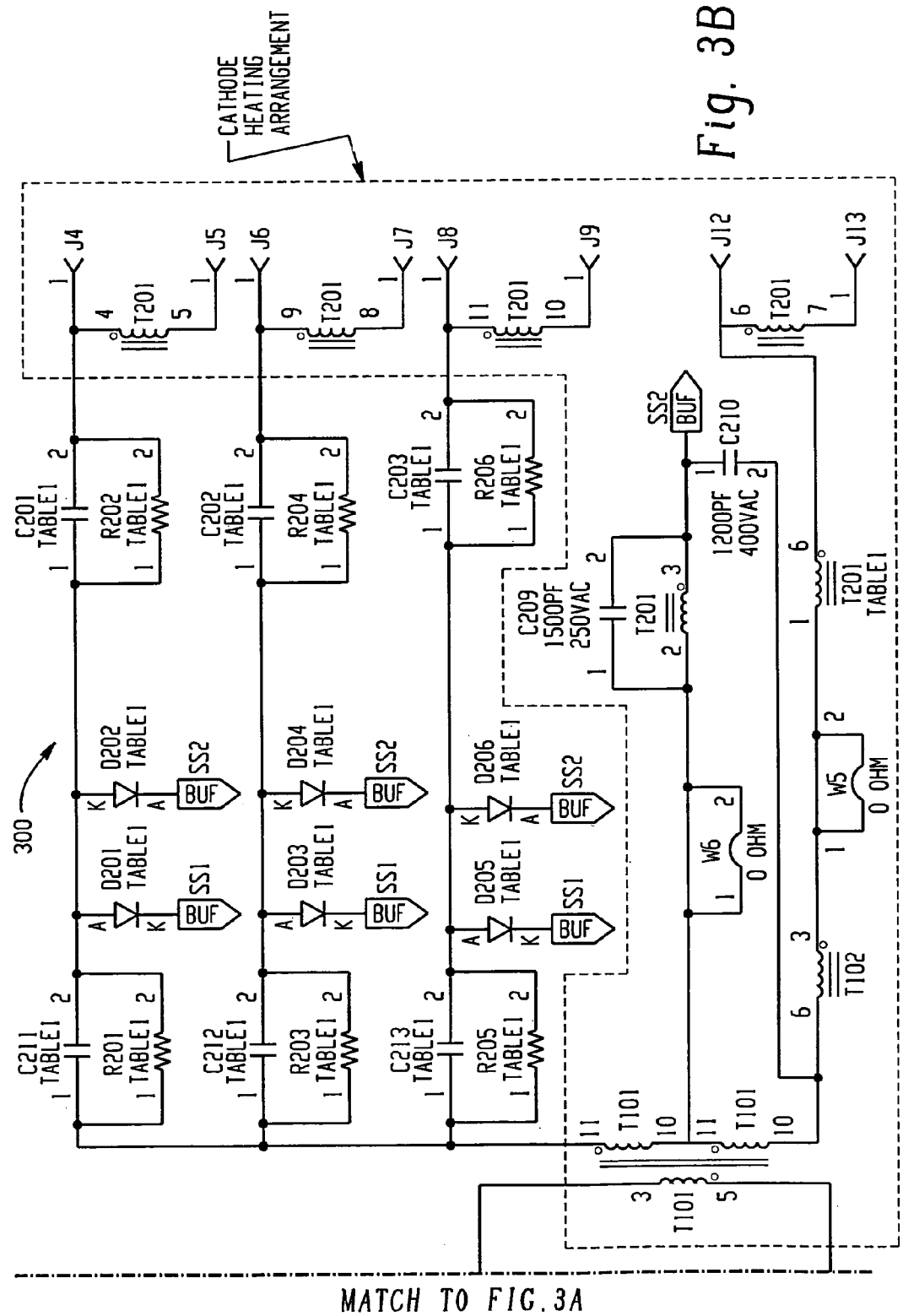
Figure 4:
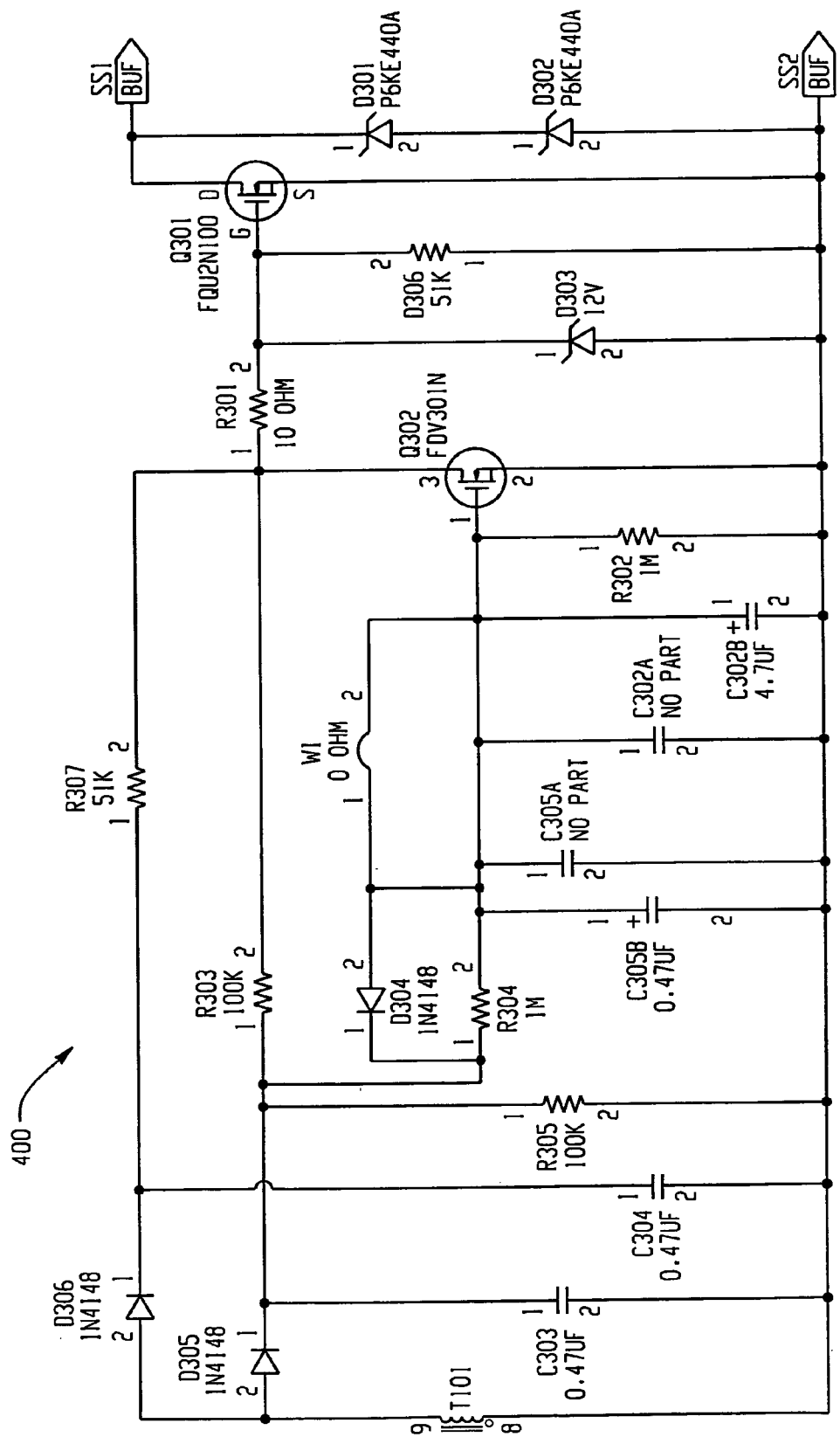
FIG. 4 is a circuit diagram of a switching circuit between preheat and steady state phases of lamp ignition in accordance with an exemplary embodiment.

Turning now to FIGS. 3A and 3B, which illustrate a circuit level configuration 300 that employs a bi-level cathode heating arrangement. The preheat current is provided to the cathode transformer T201 capacitors C211, C212 and C213. The capacitors are resonant with the magnetizing inductor of cathode heating transformer T201. Employing the configuration shown, the cathodes can be quickly heated up to Rh/Rc>5 in less than approximately 500 ms. At this point, as illustrated in FIG. 4, the preheat timing circuit turns on a transistor Q301 which then turns off a transistor Q302. Returning to FIGS. 3A and 3B, the voltage across the lamp is then shifted up and the lamp is ignited. After lamp ignition, the cathode voltage is reduced down to approximately 3V. Two power sources C210 and T201 (between lead 2 and 3); and winding T201 (between lead 1 and 6) are summed to provide constant heating to the lamp cathodes irrespective of the number of lamps that are connected to the ballast during steady state operation.

The circuit level configuration 300 provides external cathode heating to provide additional lamp current in order to maintain lamp operation. Such additional cathode heating is necessary where the lamp current may become too low to heat the cathode and maintain useful life of the lamp. As shown, capacitor C210 is employed to provide voltages that are high enough to adequately heat the cathodes of the lamps. Additionally, external cathode heating is provided via Winding T201 (between lead 6 and 1).

Winding T201 (between lead 6 and 1) picks up lamp current since it is in series with the lamp. The total lamp current (regardless of the number of lamps) is transmitted through this the winding T201 (between lead 6 and 1) and provides voltage on the other windings that are employed to heat the cathode. Capacitor C210 is employed to maintain constant cathode heating regardless of the number of lamps that are connected to the circuit. The circuit configuration allows power to be delivered regardless of the number of lamps are connected to the ballast. T201 (between lead 1 and 6) provide current to windings T201 (between lead 4 and 5; 6 and 7; 8 and 9; 12 and 13) which is a cathode heating transformer. T102 (between lead 6 and 3) is the striation control winding for injecting the even harmonics current to the lamps.

T101 (from lead 10 to 11) provides the current through T201 (from lead 2 to 3) and C210 to provide additional heating and sum up with current transmitted through T201 (from lead 1 to 6). These current paths add together to provide cathode heating during the steady state phase. However, during the preheat phase, there are two paths. The first path during the preheat phase current is passed through winding T101 (from lead 10 to 11) and through T201 (from lead 2 to 3) and then through capacitor C210.

The second current path during the preheat phase is through capacitors C211, C212 and C213 to provide current. After the preheat phase, this portion (second path) of the circuit is cut off. In addition, during the preheat phase T201 (from lead 1 to 6) is dormant because there is no current transmitted through this component and therefore only works when the lamp is on and lamp current is going through this winding and will provide voltage on the cathode heating side. This current is added together with current from another path from T 101 (from lead 10 to 11) which is transmitted through primary winding T201 (from lead 2 to 3) then through capacitor C210.

This aspect provides two level cathode heating that provides much higher cathode heating voltage and current during the preheat phase. After the preheat phase, cathode heating is reduced to approximately 3V and the circuit is arranged in such a way that when one or more lamps are lit, the cathode heating is maintained. In this manner, cathode heating can be maintained regardless of the number of lamps connected in parallel. By utilizing the circuit level configuration as shown, voltage will be driven up quickly during the preheat phase wherein a constant cathode voltage is maintained during the steady state.

With reference again to FIG. 4, after the preheat phase is complete, the transistor Q302 (e.g., field effect transistor) is employed to turn off and electrically disconnect C211, C212 and C213 after preheat is reached and the lamp is ignited. At this stage, the current through three capacitors C211, C212 and C213 and T201 (lead 2 to 3) is cut off and therefore the cathode voltage will drop lower to maintain the constant cathode heating. Thus, the cathode voltage is maintained in order to provide constant cathode heating.

Figure 5A:
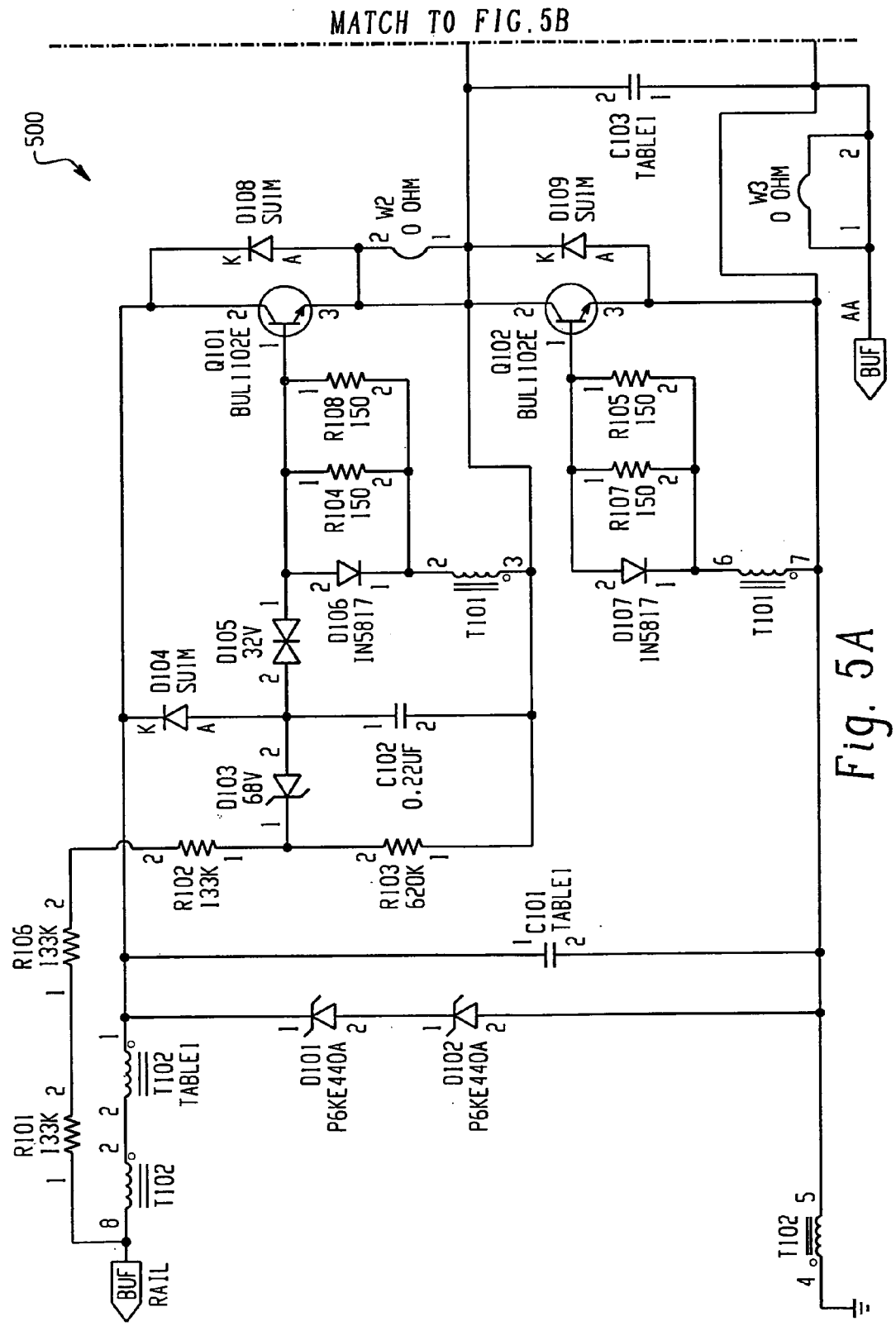
FIGS. 5A and 5B illustrate a circuit diagram of a desensitizing circuit in accordance with an exemplary embodiment.
Figure 5B:
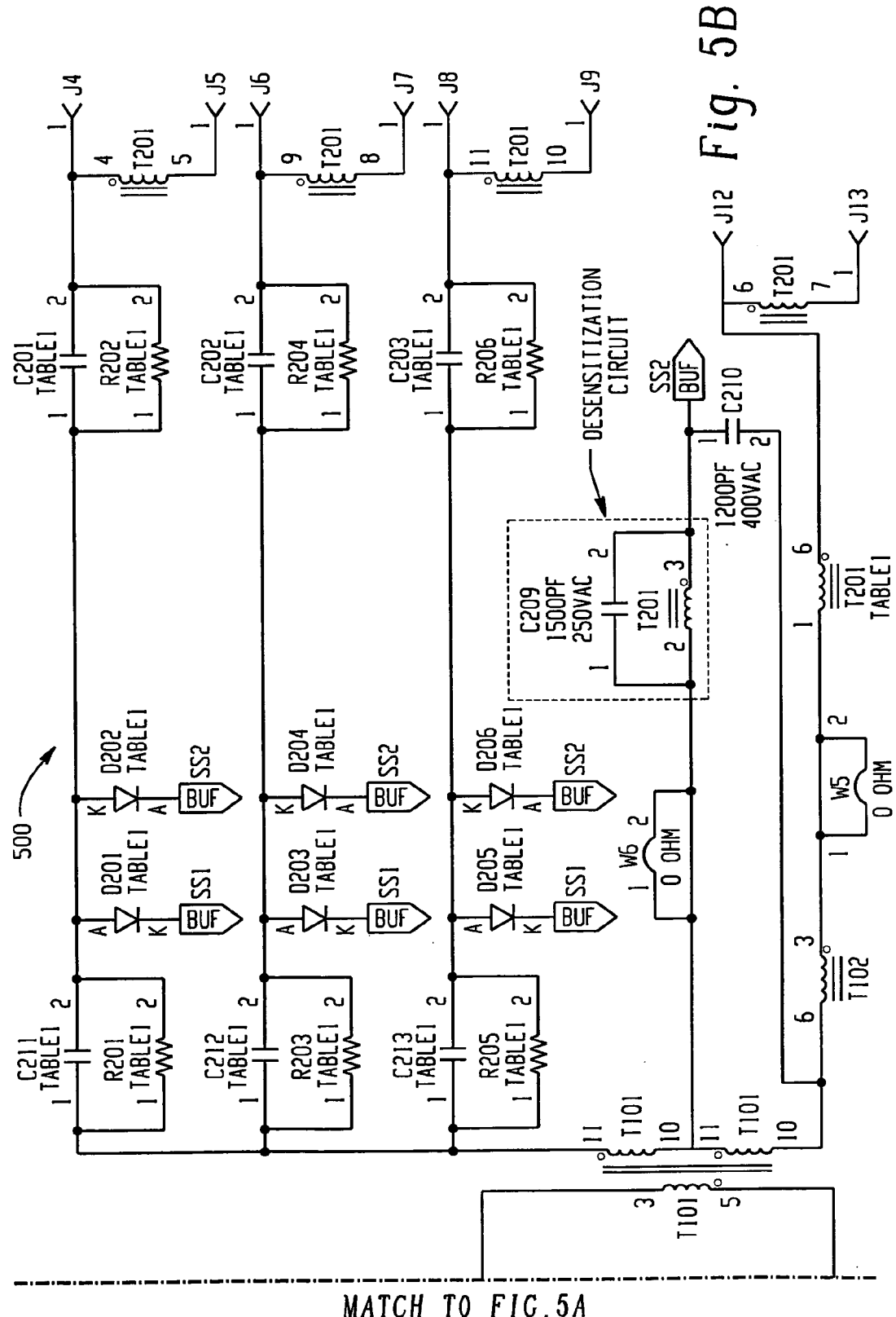

Turning now to FIGS. 5A and 5B, which illustrate a desensitization circuit that minimizes inherent noise created by parasitic capacitance associated with a lamp, fixture and lead wires. Conventionally, ballast performance is affected by number of lamps, wire length and fixture type connected to the output of the ballast. This is especially true during the ballast ignition phase. Typically, there are issues associated with the lamp during the preheat phase or when there is no lamp connected. Such issues occur based on varying capacitance that can fluctuate from one situation to another depending on the number of lamps connected, fixture type and wire lengths, for example. In other words, there can be several smaller parasitic capacitors in parallel with T201 for lead 2 to 3 and such parasitic capacitance can have impact on overall circuit performance. In extreme cases, such capacitive variation can impact internal circuit performance to cause permanent deleterious effects.

Capacitor C209 is employed to counteract parasitic capacitance and can act as a dominant factor. By employing a large enough capacitive value (e.g., 1500 pF) for capacitor C209, the circuit is no longer sensitive to the number of lamps, fixture type, etc. connected to the circuit. In this manner, the circuit is effectively desensitized from the environment (e.g., wire length, number of lamps, fixture types) during preheating phase and/or normal lighting phase.

Figure 6:
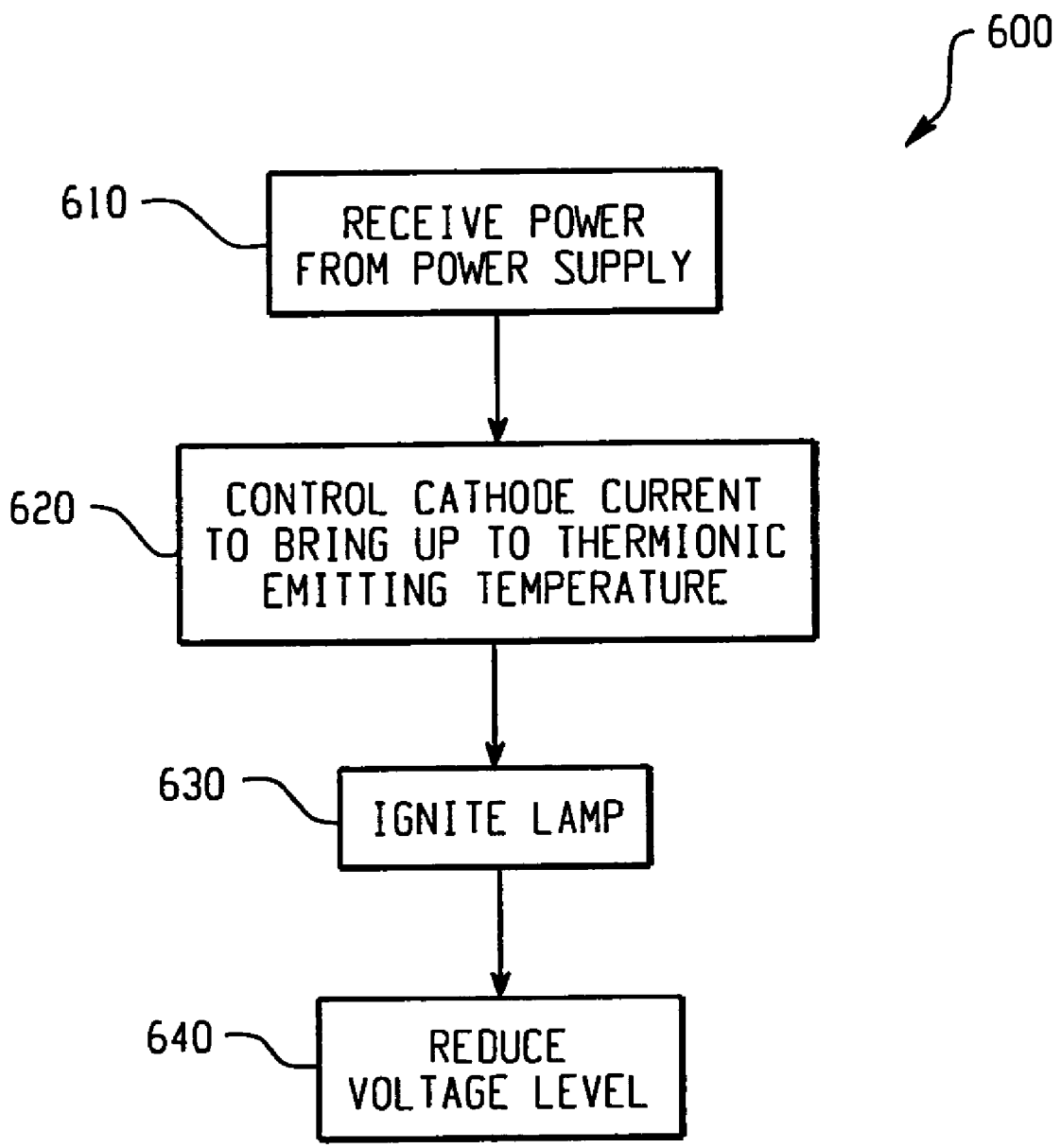
FIG. 6 is a methodology to control cathode current in accordance with an exemplary embodiment.

FIG. 6 illustrates a methodology 600 employed to control the lamp current to quickly ignite a lamp. At 610, power is received from a power supply. It is to be appreciated that substantially any power supply can be provided that is employed to power a lamp. For example, the power can be alternating current or direct current and can be delivered utilizing various voltage levels, as desired. By way of further example, the voltage can be 120V or 277V at 60 Hz or 230V at 50 Hz to accommodate various power delivery systems. At 620, the cathode current is controlled to bring the cathode temperature up to thermionic heating temperature. Such heating temperature can be reached more quickly than conventional means utilizing the systems and methods described herein. For instance, reaching a desired cathode temperature utilizing conventional means can require 0.8–1.0 seconds. In contrast, the high speed startup circuit 200 can reach a desired power level in approximately 0.3–0.4 seconds.

At 630, the lamp is ignited and at 640, the voltage level of the external cathode heating is reduced utilizing a cathode voltage reduction circuit, for example. Reducing cathode voltage after lamp ignition can offer several benefits such as longer lamp life, higher system efficiency and low cost in a single design package. In addition, such circuit arrangement and voltage reduction, the ballast can retain high quality and reliability as a typical instant start system.

Figure 7:
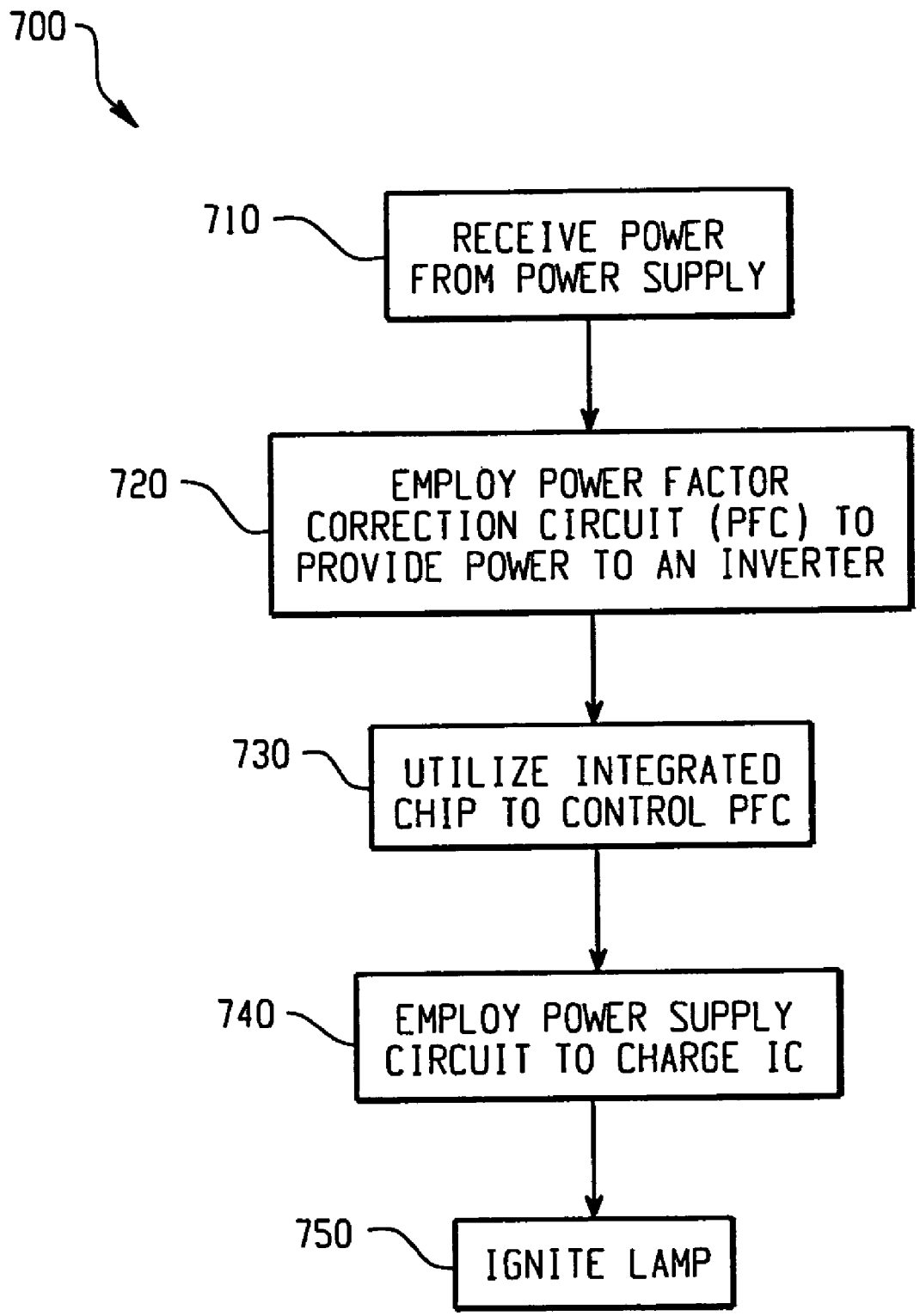
FIG. 7 is a methodology to provide power to a power factor correction circuit in accordance with an exemplary embodiment.

FIG. 7 shows a methodology 700 employed to provide power to a power factor correction circuit (PFC), in accordance with one exemplary embodiment. At 710, power is received from a power supply. At 720, the PFC is employed to provide power to an inverter and then onto one or more lamps. The PFC can be employed to convert power from an AC to a DC bus signal, for example. At 730 an integrated chip is employed to control power associated with PFC operation. At 740, a power supply is employed to provide power to charge the integrated circuit. In accordance with one exemplary embodiment, the power supply can be a speed up power supply employed to reduce overall ignition time of a ballast. At 750, the lamp is ignited.

Figure 8:
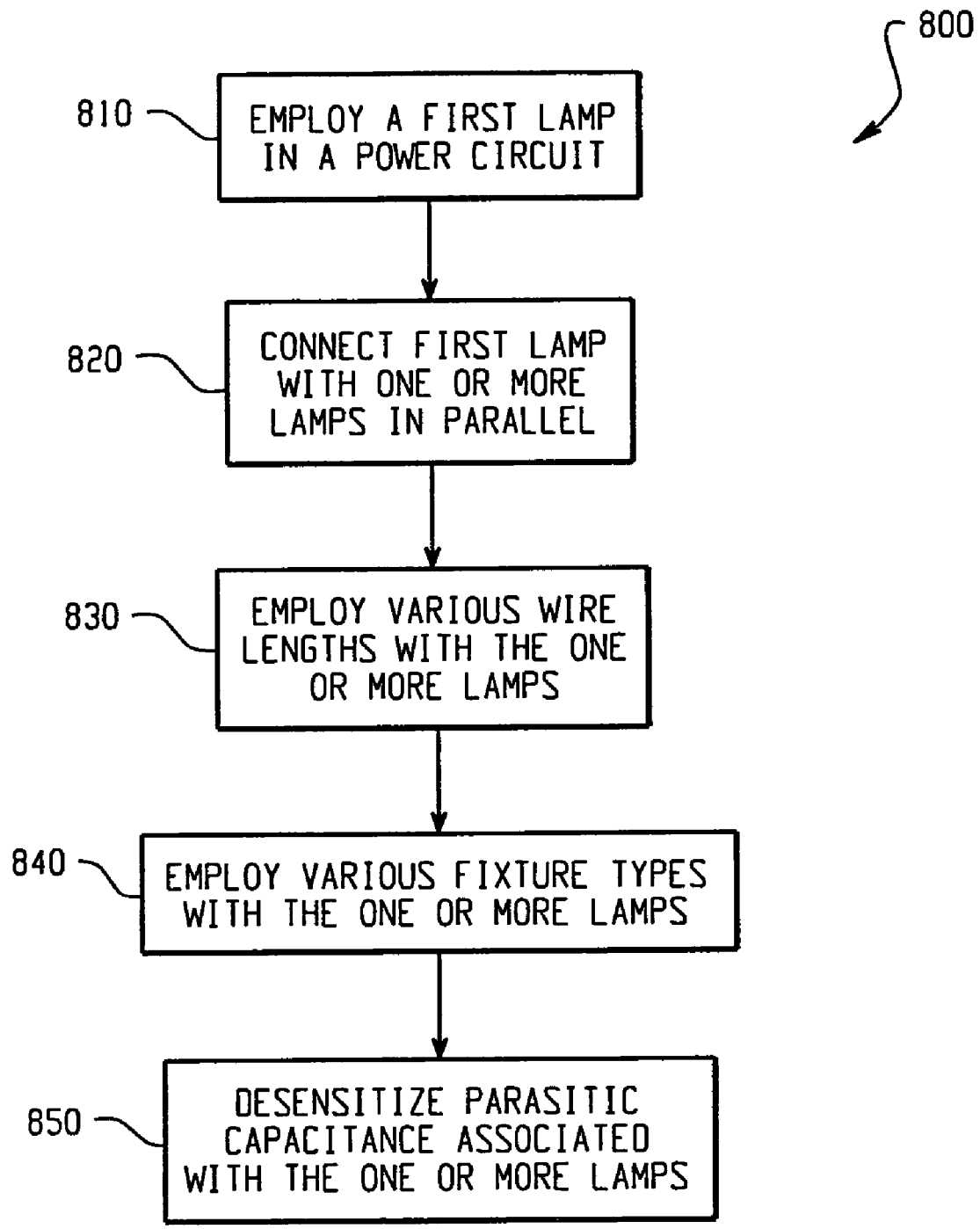
FIG. 8 is a methodology to desensitize parasitic capacitance associated with one or more lamps in accordance with an exemplary embodiment.

FIG. 8 illustrates a methodology 800 to desensitize parasitic capacitive affects associated with one or more lamps connected to a power circuit. At 810, a first lamp is employed in a power circuit. In accordance with one approach, the power can be employed to drive the first lamp utilizing various voltage and frequency, as desired. At 820, the first lamp is connected with one or more lamps in parallel. In addition, at 830 various wire lengths are employed with the one or more lamps. At 840, various fixture types are employed as well with the one or more lamps. It is to be appreciated by one skilled in the art that additional lamps as well as various wire lengths and fixtures can introduce deleterious parasitic capacitive affects when employed in conjunction with a power delivery circuit. Such affects can be more prevalent during the ballast ignition phase. Thus, at 850, such parasitic capacitance associated with the one or more lamps is desensitized. Such desensitization can minimize inherent noise impact from application.

It is to be appreciated by one skilled in the art that the foregoing disclosure does not reference every component in the circuit level drawings contained herein. Further, it is understood that the exemplary embodiments disclosed are but one approach to practice the novel concepts set forth in this disclosure. In addition, it is to be appreciated that the figures in conjunction with the specification provide an enabling disclosure to one skilled in the art. With reference to the Figures above, the term "Table 1" refers to one or more disparate component values associated with a circuit component based on various circumstances. The below chart provides values for circuit components mentioned above and/or contained in the circuit level figures:

| Reference Character | Component |
|---|---|
| C2 | Capacitor (0.22 uF) |
| C3 | Capacitor (0.01 uF) |
| C4 | Capacitor (0.022 uF) |
| C5 | Capacitor (1 uF) |
| C6, C7 | Capacitor (22 uF - 2 lamp; 33 uF - 3 lamp) |
| C9 | Capacitor (0.22 uF) |
| C10 | Capacitor (1 uF) |
| C11 | Capacitor (1 uF) |
| C12 | Capacitor (3300 pF) |
| C14 | Capacitor (0.1 uF) |
| C15 | Capacitor (4.7 uF) |
| C16 | Capacitor (8200 pF) |
| C101 | Capacitor (1500 pF - 2 lamp; 2200 pF - 3 lamp) |
| C102 | Capacitor (0.22 uF) |
| C103 | Capacitor (3900 pF - 2 lamp; 1500 pF - 3 lamp) |
| C201, C202 | Capacitor (1500 pF - 2 lamp; 2200 pF - 3 lamp) |
| C203 | Capacitor (N/A - 2 lamp; 2200 pF - 3 lamp) |
| C209 | Capacitor (1500 pF, 250 VAC) |
| C210 | Capacitor (1200 pF, 400 VAC) |
| C211, C212 | Capacitor (2700 pF - 2 lamp; 1500 pF - 3 lamp) |
| C213 | Capacitor (N/A - 2 lamp; 1500 pF - 3 lamp) |
| C302B | Capacitor (4.7 uF) |
| C303 | Capacitor (0.47 uF) |
| C304 | Capacitor (0.47 uF) |
| C305B | Capacitor (0.47 uF) |
| D1 | Diode (SS1M) |
| D2 | Diode (SS1M) |
| D3 | Diode (SS1M) |
| D4 | Diode (SS1M) |
| D5 | Diode (1N4148) |
| D6 | Diode (1N4148) |
| D7 | Diode (MUR260) |
| D8 | Zener Diode (19 V) |
| D9 | Diode (SS1M) |
| D101 | Diode (P6KE440A) |
| D102 | Diode (P6KE440A) |
| D103 | Zener Diode (68 V) |
| D104 | Diode (SU1M) |
| D105 | Diode (32 V) |
| D106 | Diode (1N5817) |
| D107 | Diode (1N5817) |
| D108 | Diode (SU1M) |
| D109 | Diode (SU1M) |
| D201, D202, D203, D204 | Diode (SR1M) |
| D205, D206 | Diode (SR1M) |
| D301 | Diode (P6KE440A) |
| D302 | Diode (P6KE440A) |
| D303 | Zener Diode (12 V) |
| D304 | Diode (1N4148) |
| D305 | Diode (1N4148) |
| D306 | Diode (1N4148) |
| Q1 | Transistor (FQD4N50 - 2 lamp; FQD6N50C - 3 lamp) |
| Q101 | Transistor (BUL1102E) |
| Q101 | Transistor (BUL1102E) |
| Q301 | Transistor (FQU2N100) |
| Q302 | Transistor (FDV301N) |
| R1 | Resistor (665K) |
| R2 | Resistor (665K) |

-continued

| Reference Character | Component |
| --- | --- |
| R3 | Resistor (13K) |
| R4 | Resistor (130K) |
| R5 | Resistor (130K) |
| R6 | Resistor (4.75K) |
| R7 | Resistor (10) |
| R8 | Resistor (47K) |
| R9 | Resistor (1.0 - 2 lamp; 1.0 - 3 lamp) |
| R10 | Resistor (340K) |
| R11 | Resistor (332K) |
| R12 | Resistor (5.62K) |
| R13 | Resistor (332K) |
| R14 | Resistor (0 Ohm) |
| R15 | Resistor (47) |
| R16 | Resistor (130K) |
| R17 | Resistor (237K) |
| R18 | Resistor (237K) |
| R19 | Resistor (N/A - 2 lamp; 3.0 - 3 lamp) |
| R20 | Resistor (665K) |
| R101 | Resistor (133K) |
| R102 | Resistor (133K) |
| R103 | Resistor (620K) |
| R104 | Resistor (150) |
| R105 | Resistor (150) |
| R106 | Resistor (133K) |
| R107 | Resistor (150) |
| R201, R202, R203, R204 | Resistor (1M - 2 lamp; 1M - 3 lamp) |
| R205, R206 | Resistor (N/A - 2 lamp; 1M - 3 lamp) |
| R301 | Resistor (10) |
| R302 | Resistor (1M) |
| R303 | Resistor (100K) |
| R304 | Resistor (1M) |
| R305 | Resistor (100K) |
| R306 | Resistor (51K) |
| R307 | Resistor (51K) |
| T1 | Inductor (1.86 mH - 2 lamp; 1.30 mH - 3 lamp) |
| T2A | Inductor (27 mH - 2 lamp; N/A - 3 lamp) |
| T2B | Inductor (N/A - 2 lamp; 18 mH - 3 lamp) |
| T101 | Inductor (0.780 mH - 2 lamp; 0.640 mH - 3 lamp) |
| T102 | Inductor (2.5 mH - 2 lamp; 2.0 mH - 3 lamp) |
| T201 | Inductor (1.08 mH - 2 lamp; 1.0 mH - 3 lamp) |
| U1 | Integrated Circuit (L6562D) |
| W1 | Fuse (0 Ohm) |
| W2 | Fuse (0 Ohm) |
| W3 | Fuse (0 Ohm) |
| W4 | Fuse (0 Ohm) |
| W5 | Fuse (0 Ohm) |
| W6 | Fuse (0 Ohm) |
| F1 | Current Source (3 A) |

What is claimed is:

1. A ballast designed to provide power to at least one lamp, comprising:
    a power factor correction (PFC) circuit configured to receive alternating current from at least one source and to convert the alternating current to direct current;
    an integrated chip configured to control operation of the power factor correction (PFC) circuit; and
    a power supply component configured to deliver power to the integrated chip, wherein the power supply component employs a speed up power supply circuit to reduce overall ignition time of the ballast, the speed up power supply circuit including a first low value capacitance connected between a power supply input and a ground lead of the speed up power supply circuit.

2. The system of claim 1, further comprising an electromagnetic interference filter that receives a signal from the at least one power source and provides an output to the PFC circuit.

3. The system of claim 1, further comprising a current fed inverter which receives the output from the PFC circuit.

4. The system of claim 3, wherein the current fed inverter is one of a half-bridge current fed inverter, a current fed push-pull inverter, a half bridge voltage fed inverter and a full bridge voltage fed inverter.

5. The system of claim 1, further comprising an open circuit voltage/preheat timing component configured to receive a signal from the PFC circuit and to time how long a pre-heat current should be applied to cathodes of the lamps.

6. The system of claim 1, further comprising a cathode current controller configured to apply pre-heat current to the at least one lamp before the operating voltage is applied to ignite and operate the at least one lamp in steady-state.

7. The system of claim 1, further comprising a buffer circuit that is designed to allow each lamp connected to the ballast to operate independently from one another.

8. The system of claim 1, wherein the cathode current is controlled to bring the cathode temperature up to a thermionic emitting temperature.

9. The system of claim 8, wherein the thermionic emitting temperature of the cathode is reached when the ratio of the final hot cathode resistance to the cold cathode resistance is greater than approximately 5 at approximately 25 degrees Celsius.

10. The system of claim 1, further comprising a cathode voltage reduction circuit which reduces the voltage of an external cathode heating circuit after lamp is ignited.

11. The system of claim 10, further including a bi-level cathode heating arrangement designed to bring the cathode temperature up to a thermionic temperature such that constant cathode heating is provided independent of the number of lamps connected to the ballast during steady state operation.

12. The system of claim 1, wherein the power supply circuit further comprises:
    a Zener diode connected in parallel with a first capacitor wherein one end of the first capacitor is connected to a second capacitor and the other end is connected to a third capacitor which in turn has a connection between the second and third capacitors to an inductor wherein the inductor is connected to an RC circuit consisting of a fourth capacitor and a resistor wherein the other side of the RC circuit is connected to two diodes that are each in turn connected to the second and third capacitors.

13. The system as set forth in claim 1, wherein the speed up power supply circuit further includes:
    second, third, and fourth capacitances, a resistor, and first and second diodes to provide a quick charge to the first low value capacitance upon initialization of the speed up power supply circuit.

* * * * *